(12) United States Patent
Yang et al.

(10) Patent No.: US 6,307,174 B1
(45) Date of Patent: Oct. 23, 2001

(54) METHOD FOR HIGH-DENSITY PLASMA ETCHING

(75) Inventors: Chan-Lon Yang, Taipei; Michael W C Huang, Taipei Hsien; Tong-Yu Chen, Hsinchu, all of (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 09/533,036

(22) Filed: Mar. 22, 2000

Related U.S. Application Data

(63) Continuation-in-part of application No. 09/241,840, filed on Feb. 1, 1999, now abandoned.

(51) Int. Cl.$^7$ .................................................... B23K 10/00
(52) U.S. Cl. ................ 219/121.41; 219/121.59; 219/121.43; 204/298.31; 430/329; 438/725
(58) Field of Search ............................ 219/121.4, 121.41, 219/121.43, 121.59, 121.36; 438/725; 156/345, 646.1; 204/298.31; 315/111.31, 111.51; 430/329

(56) References Cited

U.S. PATENT DOCUMENTS

| | | | |
|---|---|---|---|
| 5,773,201 | * | 6/1998 | Fujimura et al. .................. 430/329 |
| 5,824,604 | * | 10/1998 | Bar-Gadda .......................... 438/725 |

* cited by examiner

*Primary Examiner*—Mark Paschall
(74) *Attorney, Agent, or Firm*—Jiawei Huang; J. C. Patents

(57) ABSTRACT

A method for high-density plasma etching. A substrate is provided. A material layer is formed on the substrate. A patterned photo-resist layer is formed on the oxide layer. The material layer is patterned by the high-density plasma etching, simultaneously, a formation of a barrier layer over the substrate with the patterning process is suppressed and nitrogen gas generated in the patterned photo-resist layer is reduced.

15 Claims, 1 Drawing Sheet

METHOD FOR HIGH-DENSITY PLASMA ETCHING

CROSS-REFERENCE OF RELATED APPLICATIONS

This application is a Continuation-in-part application of, and claims the priority benefit of, U.S. application Ser. No. 09/241,840 filed on Feb. 01, 1999 now abandoned.

BACKGROUND OF THE INVENTION

1. Field of the Invention

The present invention relates to an etching method. More particularly, the present invention relates to a method for high-density plasma etching.

2. Description of the Related Art

In the device patterning process, to enhance the photosensitivity contrast, amine compounds are often added into a photo-resist layer. While performing the conventional etching process using a high density plasma (HDP) oxide etcher, a high intensity ultraviolet (UV) radiation is generated. It is found that the amine compounds from the photo-resist materials would be decomposed under the high-intensity UV radiation and produce nitrogen gas. Resist bubblings are thus occurred in the photo-resist layer by the diffusion of the nitrogen gas. Being obstructed by a barrier layer formed on the photo-resist layer, the bubbles of the nitrogen gas are further retained in the photo-resist layer instead of sweating out. After accumulated a certain concentration or pressure to certain, a pressure burst is easily caused.

SUMMARY OF THE INVENTION

Accordingly, the invention provides a method for high-density plasma etching. A substrate is provided. A material layer is formed on the substrate. A patterned photo-resist layer is formed on the oxide layer. The material layer is patterned by the high-density plasma etching, simultaneously, a formation of a barrier layer over the substrate Ninth the patterning process is suppressed and nitrogen gas generated in the patterned photo-resist layer is reduced. Adjustments of high-density plasma etching process parameters are made to reduce the intensity of the induced UV radiation, the amount of the nitrogen gas, so as to suppress the bubbling effect. The parameters includes an operation pressure, a flow rate of carbon monoxide, a flow rate of an argon gas, a flow rate of octafluorocyclobutane ($C_4F_8$), a supplied power, and a process temperature.

Moreover, by adjusting the above parameters, the barrier layer formed on the photo-resist layer dog etching process becomes thinner and easier to release trapped nitrogen gas. Even nitrogen gas is produced, the bubbles can be avoided with less obstruction by the thinner barrier layer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
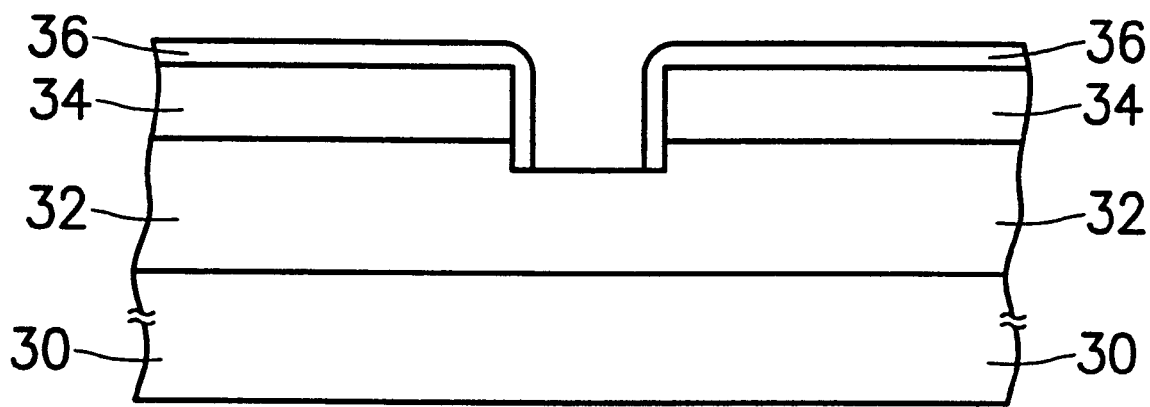
FIG. 1 is a schematic, cross-sectional view showing an oxide layer etched by a high-density plasma etching process according to one preferred embodiment of the invention.

A photolithography process comprises steps of exposure, development of a photo-resist layer to transfer a pattern from a photo-mask to the photo-resist layer. The photoresist layer is then etched and used as a mask to etch and define a layer underlying the photo-resist layer.

FIG. 1 shows a method of etching an underlayer of a photo-resist layer over a substrate A material layer 32 to be patterned is formed on a substrate 30. The material layer 32 can be made of oxide by chemical vapor deposition, for example. A patterned photo-resist layer 34 is formed and patterned on the material layer 32.

During the step of forming the patterned photo-resist layer 34, amine compounds are often added into the photo-resist layers to increase the photosensitivity contrast. However, it is found that while performing a high density plasma dry etching on the material layer 32, a high intensity ultra-violet light is induced. Under the high intensity ultra-violet light, the amine compounds reacted with the photo-resist layer and are decomposed into a nitrogen gas. The nitrogen gas is then diffused through the photo-resist layer and cause bubbles therein. In addition, during etching, a barrier layer 36, that is, a polymer layer, is produced to improve the selectivity and profile control. The formation of the barrier layer 36 on the photo-resist layer 34 thus easily blocks the bubbles from sweating out. The accumulation of trapped nitrogen gas leads to a pressure burst.

In the invention, parameters of the HDP etching process are adjusted to control the intensity of the induced UV radiation With a reduced induced UV radiation intensity, the product of the nitrogen gas is suppressed, or even eliminated. In another aspect, the parameters of the HDP etching process are adjusted to reduce the thickness of the barrier layer which obstruct the release of the bubbles trapped within the photoresist layer. The parameters comprises a flow rate of argon monoxide (CO), an operation pressure in a high-density plasma chamber, a flow rate of argon gas (Ar), a flow rate of octafluorocyclobutane ($C_4F_8$), a supplied power, and a process temperature. The HDP process in the present invention can be performed without supplying an argon gas.

From the experiment, it is found that to achieve the above object, the flow rate of CO is preferably ranged about 10 to 25 sccm, or even as high as about 50 sccm. The operation pressure is about 3 mTorr to 100 mTorr. The flow rate of argon gas is about 100 sccm to 500 sccm. Or alternatively, the etching process can be performed without supplying an argon gas. The flow rate of $C_4F_8$ is preferably about 10 sccm to 20 sccm. The supplied bias power is preferably about 500 W to 2000 W. The supplied total source power is preferably about 500 W to 2000 W. The process temperature preferably is as chill as about −15° C. to 10° C. With the parameters described above, the intensity of UV radiation can be effectively reduced to prevent generating nitrogen gas. Additionally, the formation of the polymer layer is suppressed. With the reduction of the polymer layer, the trapped nitrogen gas can be effectively released from the polymer layer.

In summary, the invention includes at least the following advantages:

1. The invention decreases the amount of the nitrogen gas generated during the high-density plasma etching.

2. In comparison with the conventional method, the thickness of the polymer layer formed during high-density plasma etching is specifically decreased. Thus, the pressure burst does not occur.

It will be apparent to those skilled in the art that various modifications and variations can be made to the structure and the method of the present invention without departing from the scope or spirit of the invention. In view of the foregoing, it is intended that the present invention cover modifications and variations of this invention provided they fall within the scope of the following claims and their equivalents.

What is claimed is:

1. A method for reducing the amount of nitrogen generated during a high-density plasma etching performed on an underlayer of a photo-resist layer added with amine compounds simultaneously with reducing a thickness of a barrier layer formed on the photo-resist layer with a process of the high-density plasma etching, the method comprising the steps of:

adjusting etching parameters comprising:
an operation pressure of about 3 mTorr to 100 mTorr;
a CO flow rate of about 10 sccm to 50 sccm;
a flow rate of $C_4F_8$ of about 10 sccm to 20 sccm;
a total source power of about 500 W to 2000 W; and
a process temperature during high-density plasma etching of about −15° C. to 10° C.

2. The method of claim 1, wherein the CO flow rate is about 10 sccm to 25 sccm.

3. The method of claim 1, wherein the step of adjusting the etching parameters further comprises adjusting a flow rate of an argon gas less than about 500 sccm.

4. The method of claim 1, wherein the step of adjusting the etching parameters further comprises adjusting a flow rate of an argon of about 100 sccm to 500 sccm.

5. The method of claim 1, further comprises a bias power of about 500 W to 2000 W.

6. A method for high-density plasma etching, comprising the steps of:

providing a substrate;

forming a material layer on the substrate;

forming a patterned photo-resist layer on the oxide layer; and patterning the material layer by the high-density plasma etching simultaneously with suppressing a formation of a barrier layer over the substrate and reducing nitrogen gas generated in the patterned photo-resist layer.

7. The method of claim 6, wherein the step of patterning the material layer comprises a CO flow rate of about 10 sccm to 50 sccm.

8. The method of claim 7, wherein the step of patterning the material layer comprises the CO flow rate is about 10 sccm to 25 sccm.

9. The method of claim 6, wherein the step of patterning the material layer comprises an operation pressure in a high-density plasma etching chamber used to perform the high-density plasma etching of about 3 mTorr to 100 mTorr.

10. The method of claim 6, wherein the step of patterning the material layer comprises adjusting a flow rate of an argon gas at a range less than 500 sccm.

11. The method of claim 10, wherein the step of patterning the material layer comprises the flow rate of the argon gas of about 100 sccm to 500 sccm.

12. The method of claim 6, wherein the step of patterning the material layer comprises a flow rate of $C_4F_8$ of about 10 sccm to 15 sccm.

13. The method of claim 6, wherein the step of patterning the material layer comprises a total source power of about 500 W to 1100 W.

14. The method of claim 6, wherein the step of patterning the material layer is performed under a temperature of about −15° C. to 10° C.

15. The method of claim 6, wherein the step of patterning the material layer comprises a bias power of about 500 W to 2000 W.

* * * * *